(12) United States Patent
Nonaka

(10) Patent No.: US 7,015,849 B2
(45) Date of Patent: Mar. 21, 2006

(54) CONTROL CIRCUIT

(75) Inventor: Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 118 days.

(21) Appl. No.: 10/702,211

(22) Filed: Nov. 4, 2003

(65) Prior Publication Data
US 2004/0263372 A1    Dec. 30, 2004

(30) Foreign Application Priority Data
Nov. 8, 2002  (JP) ............................. 2002-325793
Nov. 15, 2002 (JP) ............................. 2002-332466

(51) Int. Cl.
*H03M 1/12* (2006.01)
(52) U.S. Cl. .................................... 341/155; 341/144
(58) Field of Classification Search ................. 341/144, 341/155, 141, 137, 134
See application file for complete search history.

(56) References Cited

U.S. PATENT DOCUMENTS

| | | | | |
|---|---|---|---|---|
| 5,191,187 A | * | 3/1993 | Kajikawa | ................ 219/121.76 |
| 5,495,463 A | * | 2/1996 | Akagi et al. | ................. 369/116 |
| 5,932,861 A | * | 8/1999 | Iwaguchi et al. | ............ 235/455 |
| 6,788,340 B1 | * | 9/2004 | Chen et al. | ............... 348/229.1 |
| 2003/0066953 A1 | * | 4/2003 | Kwon | .................... 250/227.18 |
| 2005/0045807 A1 | * | 3/2005 | Sakaguchi | .............. 250/214 R |

FOREIGN PATENT DOCUMENTS

| | | |
|---|---|---|
| JP | 06-260851 | 9/1994 |
| JP | 11-142722 | 5/1999 |

* cited by examiner

*Primary Examiner*—Peguy JeanPierre
(74) *Attorney, Agent, or Firm*—Frishauf, Holtz, Goodman & Chick, P.C.

(57) ABSTRACT

According to the present invention, there is disclosed a control circuit in which a D/A converter having an output voltage switchable based on a set value held in a register, an operation amplifier including two input terminals and one output terminal, and a switch for selectively inputting an output of the D/A converter into one of two input terminals of the operation amplifier are constituted on the same chip. The input terminal which has not been selected by the switch and the output terminal of the operation amplifier are connectable to an external circuit.

9 Claims, 10 Drawing Sheets

CONTROL CIRCUIT

CROSS-REFERENCE TO RELATED APPLICATIONS

This application is based upon and claims the benefit of priority from the prior Japanese Patent Applications No. 2002-325793, filed Nov. 8, 2002; and No. 2002-332466, filed Nov. 15, 2002, the entire contents of which are incorporated herein by reference.

BACKGROUND OF THE INVENTION

1. Field of the Invention

The present invention relates to improvements of control circuits such as a one chip microcomputer in which an analog circuit is formed on the same chip.

2. Description of the Related Art

A control circuit (microcomputer) on which an analog circuit including an operation control section to perform a digital operation and additionally, for example, an operation amplifier on the same chip is mounted has been used in various fields. The present applicant has proposed a microcomputer in which an analog circuit for exclusive use in a camera is built in, for example, in Jpn. Pat. Appln. KOKAI Publication No. 11-142722.

Moreover, an auto focus (AF) camera has heretofore been developed by which a light is projected onto a subject and a reflected signal light is detected to judge whether a subject is far or near, so that automatic focusing is possible in accordance with a result of the judgment. Moreover, a technique for inexpensively constituting basic functions in the camera is known in the above-described publication. In this technique, for example, a distance-measuring circuit for performing AF is constituted on the same chip as that of the microcomputer of a sequence controller of the camera.

Furthermore, the microcomputer has also been used in merchandises for consumers, such as various electric products and portable apparatuses. Accordingly, complicated operations or sequence controls based on operation inputs by users or detection results by sensors, further controls of displays or actuators, and the like can easily be carried out in accordance with predetermined programs.

In recent years, there has also been a microcomputer in which, in addition to a timer and a pulse generator, the control of the display (e.g., LCD), and peripheral circuits such as an A/D conversion circuit and a D/A conversion circuit are efficiently built in the chip. Since this microcomputer can similarly be used in different products, cost reduction has been advance because of a mass production effect. For example, the above-described chip for use in the control is also used for remote controllers and household electric appliances.

Moreover, with respect to an improvement in the above-described operation amplifier, a technique has been proposed in Jpn. Pat. Appln. KOKAI Publication No. 6-260851 in which a switch changeover function is disposed in an input section of the operation amplifier to perform an offset correction.

BRIEF SUMMARY OF THE INVENTION

An object of the present invention is to provide a control circuit which is small in size, low in cost, and high in versatility.

Another object of the present invention is to provide an inexpensive photodetection circuit in which a microcomputer having high versatility is effectively used even with an inexpensive constitution.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

FIG. 4 is a diagram showing an example of an IC chip in which a general operation amplifier is built in;

FIG. 5 is an electric circuit diagram showing the constitution of a motor control circuit and photometry circuit of a camera in which two operation amplifiers are built in;

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
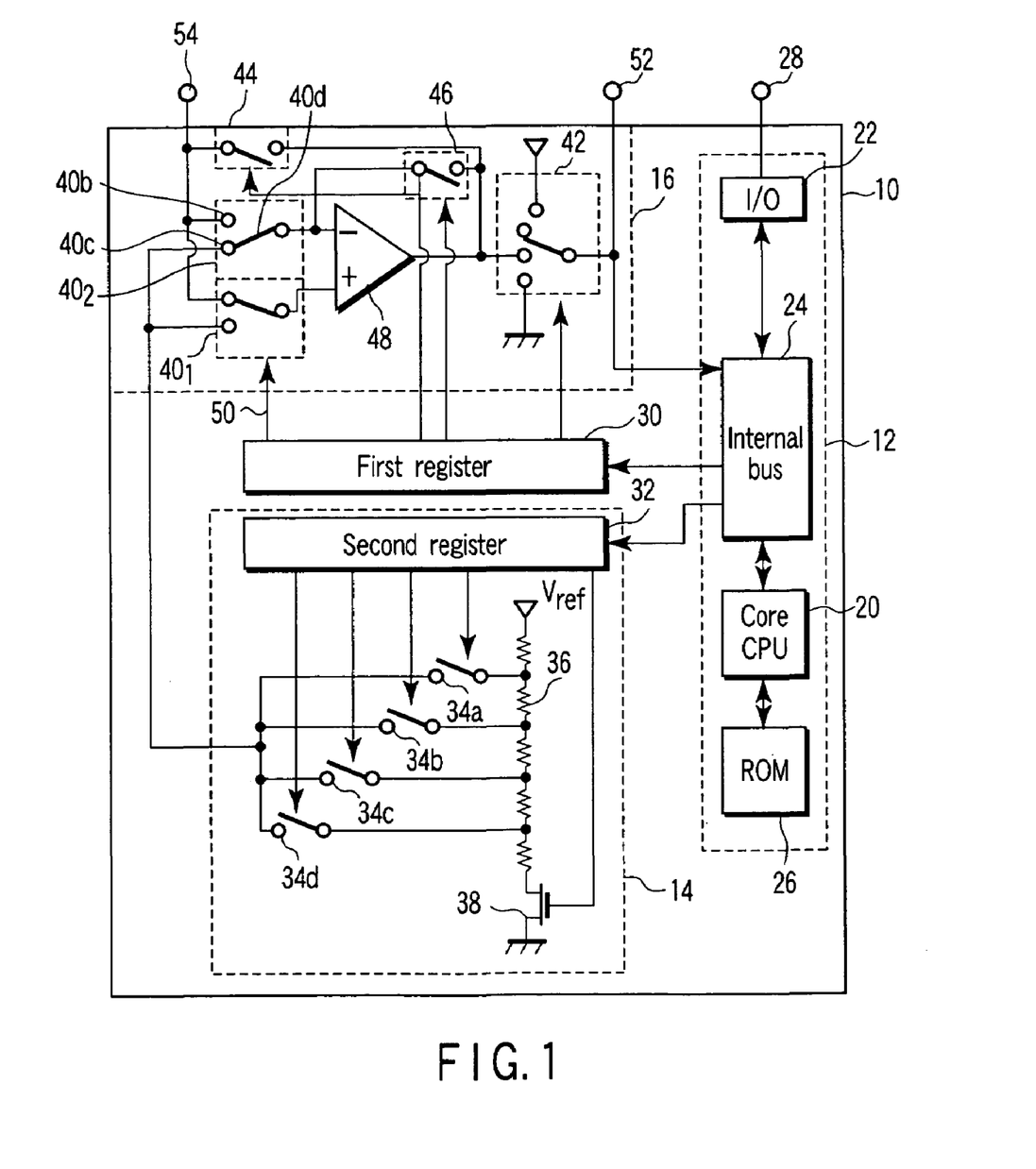
FIG. 1 is an electric circuit diagram showing constitutions of a control circuit and photodetection circuit according to a first embodiment of the present invention.

FIG. 1 is an electric circuit diagram showing one example of a control circuit according to a first embodiment of the present invention.

In FIG. 1, a whole circuit will generically be referred to as a control circuit 10 in which a microcomputer (hereinafter referred to as a control CPU) 12, a digital/analog (D/A) converter 14, and peripheral circuits such as an operation amplifier circuit 16 are constituted on one chip.

The control CPU 12 is an integrated circuit including a core CPU 20, input/output (I/O) circuit 22, internal bus 24, and ROM 26. For example, when a signal is inputted into the control CPU 12 via an input terminal 28, the signal is inputted into the core CPU 20 via the I/O circuit 22 and internal bus 24. The core CPU 20 executes a predetermined sequence control based on a predetermined program written in the ROM 26 based on the inputted signal.

Values held in a first register 30 and second register 32 via the internal bus 24 can be set in the control circuit 10 according to the first embodiment.

First, analog switches 34a to 34d are controlled to be on/off in accordance with a value set to the second register 32. A divided voltage of a resistance array 36 connected in series to a transistor 38 changes in accordance with the on/off state of these analog switches 34a to 34d. Therefore, various voltages are supplied to the operation amplifier circuit 16 in accordance with the on/off state of the switch. For example, when the switch 34a is turned on and the other switches are off, a high voltage is supplied to the operation amplifier circuit 16. When the switch 34d is turned on and the other switches are off, a low voltage is supplied to the operation amplifier circuit 16.

It is to be noted that it is shown here for the sake of simplicity that four types of output voltages of the analog switches 34a to 34d can be supplied, but in actual the switching of 8 to 10 bits is possible.

Moreover, the first register 30 switches/controls analog switches $40_1$, $40_2$, 42, 44, and 46. In FIG. 1, when the switch $40_1$, $40_2$ constituted of two switches is controlled to be on/off, the output from the D/A converter 14 is selectively inputted into any of a minus (−) side terminal and plus (+) side terminal of the operation amplifier 48.

Figures 2A, 2B, 3A, 3B:
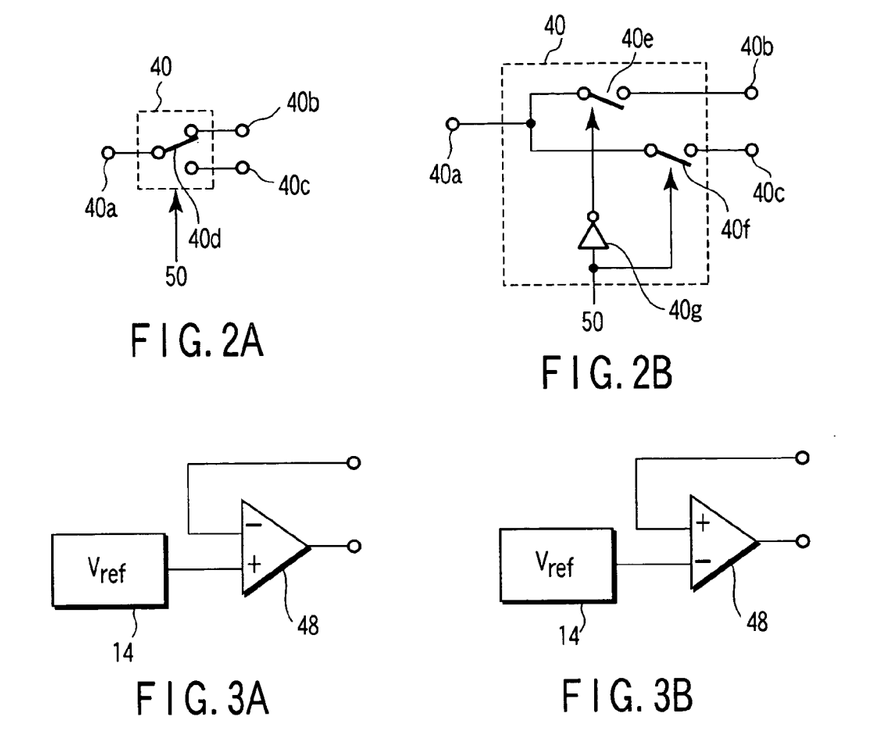
FIG. 2A is a schematic diagram of a switch for switching an input to an input terminal of an operation amplifier.
FIG. 2B is a diagram showing a modification of the switch of FIG. 2A.
FIGS. 3A to 3D are schematic diagrams showing that the operation amplifier is usable as various circuits by changeover of the switch.

FIG. 2A is a schematic diagram of one of the switches $40_1$, $40_2$. Here, a switch 40 is shown. That is, in response to a control signal 50 from the first register, a switch portion 40d in the switch 40 can be changed over to selectively input the signal from a terminal 40a into either terminal 40b or 40c.

It is to be noted that this switch 40 may also be constituted as shown in FIG. 2B. That is, FIG. 2B shows a combination of switch portions 40e, 40f for switching on/off. In this case, the switch portion. 40f is controlled to be on/off by the control signal 50. The control signal 50 is also inputted into an inverter 40g, and a reverse signal of the control signal 50 is outputted from the inverter 40g. Accordingly, since a signal having a signal level constantly reverse to that of the switch portion 40f is inputted into the switch portion 40e, the signal from the terminal 40a is selectively inputted into either terminal 40b or 40c.

Moreover, the switch $40_2$ connected to the minus side input of an operation amplifier 48 shown in FIG. 1 can also be constituted in the same manner as in the switch $40_1$.

In FIG. 1, two switches $40_1$, $40_2$ are disposed in an input portion of the operation amplifier 48. In a state in which the switches 44, 46 of FIG. 1 are off by the setting of the first register 30, the output of the operation amplifier 48 is connected to an external terminal 52 by the switch 42. Then, an operation amplifier circuit including a circuit constitution shown in FIG. 3A or 3B can selectively be constituted.

It is to be noted that the external terminal 52 may also be fixed at a high (H) level output or a low (L) level output without being connected to the operation amplifier 48. That is, the switch 42 performs four types of switching: connection of an output terminal of the operation amplifier 48 to the external terminal 52; release of the output terminal of the operation amplifier 48; the fixing of a potential level of the external terminal 52 at H level; and the fixing of the potential level of the external terminal 52 at L level.

It is to be noted that in the present embodiment, a potential state of the external terminal 52 can be changed by the switch 42 in a circuit constitution, but the switch 42 may also be constituted such that the potential state of the output of the operation amplifier 48 is changeable.

Figure 3C:
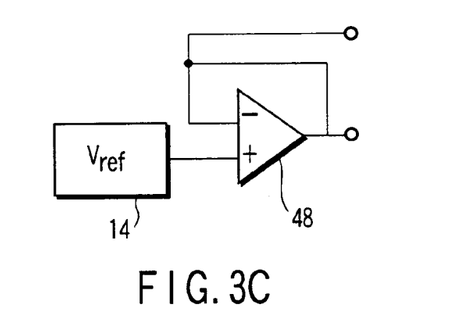

Moreover, the external terminal 52 is disconnected from the output terminal of the operation amplifier 48, further the switch 46 is turned off, and the switch 44 is turned on. Furthermore, when the output from the D/A converter 14 is inputted on the plus side of the operation amplifier 48 by the switches $40_1$, $40_2$, a buffer circuit can be constituted as shown in FIG. 3C.

Figure 3D:
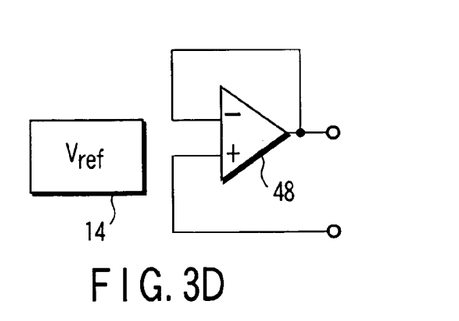

Furthermore, when the plus side input of the operation amplifier 48 is connected to an external terminal 54 by the switches $40_1$, $40_2$ of FIG. 1, the minus side input is disconnected from the D/A converter 14, further the switch 46 is turned on, and the switch 42 is connected to the external terminal 52 and the output of the operation amplifier 48, an operation amplifier circuit shown in FIG. 3D may also be constituted.

Figure 4:
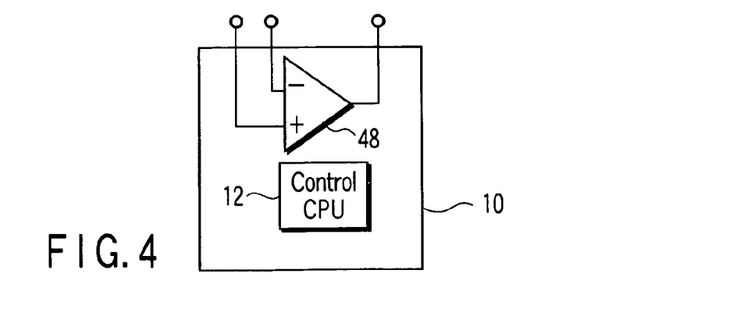

It is to be noted that, in this case, the switch 44 is turned off beforehand. By this devise, three external terminals shown in FIG. 4 are not required, even when the operation amplifier 48 is constituted on the same chip as the control CPU 12. That is, since only two external terminals 52, 54 function in the same manner as in the operation amplifier circuit including three external terminals, it is possible to maximize features possessed by the operation amplifier 48 only with the external terminals 52, 54.

That is, an area of IC is determined not only by a scale of a built-in circuit but also largely by the number of terminals (pins). Therefore, even when the built-in circuit is reduced in size, the whole area of the IC is not reduced as long as the number of terminals is large. That is, wires, solder balls, and the like are used for the connection to external circuits in the terminals of IC, but a predetermined area is also required for a pad portion for the connection of the wires, and the like. Therefore, when the number of terminals is large, the area of the whole IC also increases.

In the present embodiment, a large number of types of operation amplifier circuits can be constituted by the above-described devises. Moreover, even a circuit requiring three external terminals can be constituted of two external terminals. As a result, since the number of pads can be decreased, the IC can be reduced in size, that is, cost.

Figure 5:
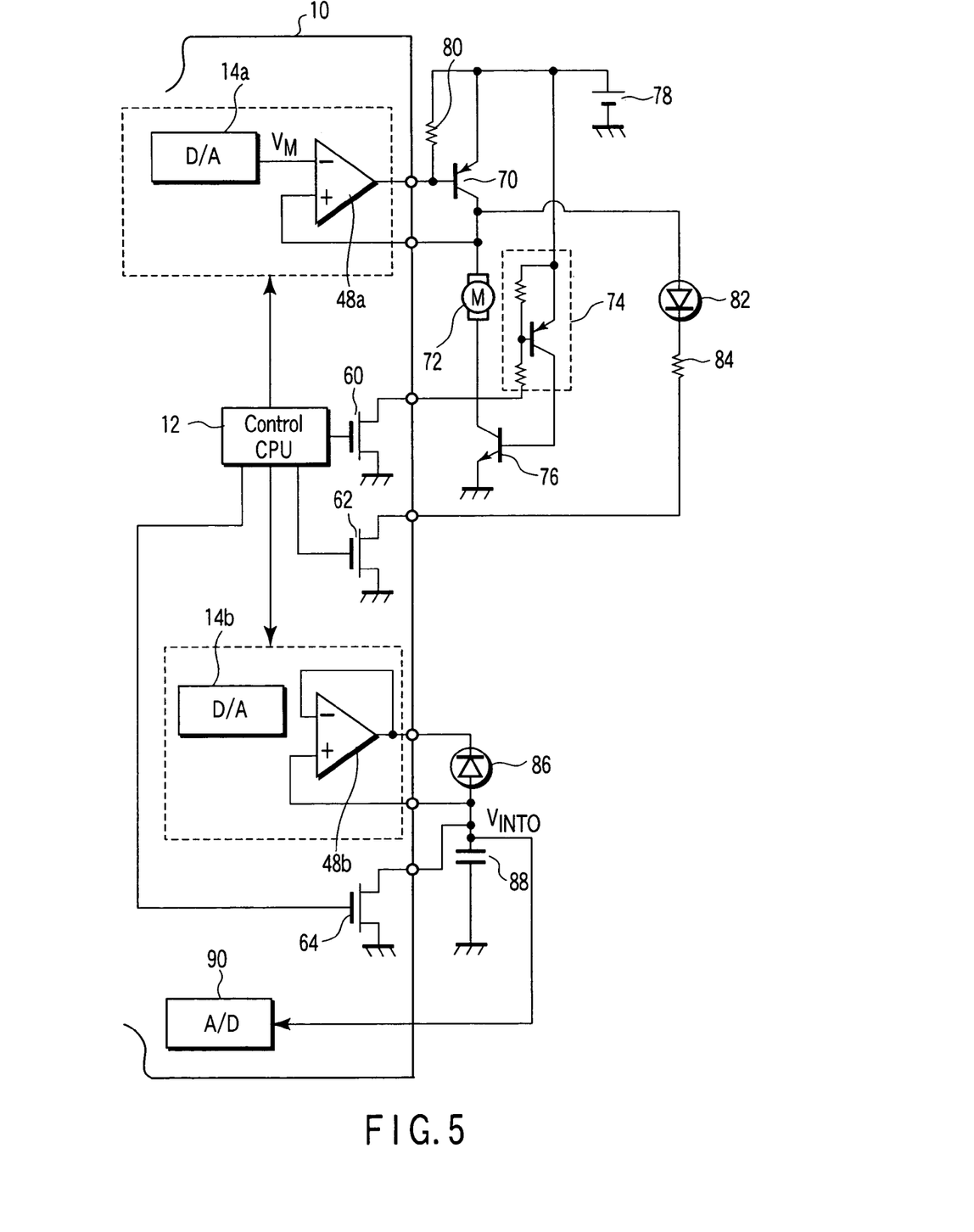

FIG. 5 shows an example of the circuit in which two operation amplifiers described above are built in. It is to be noted that this example relates to a circuit built in the camera.

In one operation amplifier 48a, the respective switches are controlled based on the setting of a register (not shown), and the amplifier is constituted as shown in FIG. 3A. The other operation amplifier 48b is similarly constituted as shown in FIG. 3D based on the setting of the register (not shown).

A base potential of a transistor 70 is controlled in the output of the operation amplifier 48a. More-over, a collector potential of the transistor 70, that is, a voltage applied to a motor 72 is monitored in the plus side terminal of the operation amplifier 48a.

When a transistor 60 and transistor circuit 74 are turned on, a transistor 76 is turned on. Accordingly, a current flows into a motor 72 from a power supply 78 to drive the motor 72. In the operation amplifier 48a, the voltage of the motor 72 is monitored, and the current flowing through the transistor 70 is controlled so that the voltage applied to the motor 72 indicates an output level $V_M$ of the D/A converter.

It is to be noted that a shunt resistance 80 is disposed to improve transmission properties of the circuit.

When the motor 72 in this circuit constitution is used to drive a camera shutter or perform zooming with a zoom lens, the motor can be driven at a stable speed regardless of a power voltage. Accordingly, correct exposure, zoom position control, and the like are possible, and a beautiful picture can be taken.

Further in the operation amplifier 48a, when the switch 42 of FIG. 1 is turned off, it is possible to bring the output into an open state. Furthermore, the switch 46 is turned on, the minus side terminal of the operation amplifier 48 is connected to the external terminal 54 by the switch 40, and the plus side terminal is connected to a D/A converter 14a. In this case, the voltage determined by the D/A converter 14a is outputted from the external terminal 54.

That is, in this case, the transistor 60 of FIG. 5 is turned off, and a transistor 62 is turned on. Then, the voltage determined by the D/A converter 14a is outputted from the input terminal of the operation amplifier 48a of FIG. 5, and a light emitting device (LED) 82 is constant-current driven by a resistance 84. Accordingly, the LED 82 emits light with a certain brightness regardless of deterioration of a battery.

Here, it needs to be noticed that the voltage is outputted from the minus side terminal of the operation amplifier 48a. That is, the operation amplifier 48a is used in the form shown in FIG. 3B in some case and in the form shown in FIG. 3C in the other case. By these devises, operations of two devices (motor 72 and LED 82 herein) can selectively be controlled by a positive voltage control function of the operation amplifier, even when only two terminals are disposed outside the IC.

Next, the other operation amplifier 48b will be described.

The operation amplifier 48b has the form shown in FIG. 3D as described above. In FIG. 3D, the operation amplifier 48b is disconnected from a D/A converter 14b. Moreover, two terminals of the operation amplifier 48b are connected to a photodiode 86, and the photodiode 86 is stabilized at a zero bias. Moreover, a photo-electric current flows in a direction of a capacitor 88 from the photodiode 86 in accordance with the brightness of the light incident from the outside.

Here, when an N-channel open-drain transistor 64 is turned off, a voltage $V_{INTO}$ is generated in accordance with the brightness of the light incident upon the photodiode 86 after elapse of a predetermined time. When the voltage $V_{INTO}$ is detected by an analog/digital (A/D) converter 90, the brightness of a subject can be detected. When the brightness of the subject is detected in this method, and exposure conditions are determined in the control CPU 12 in accordance with the brightness of the subject, the exposure can appropriately be controlled in accordance with the brightness of the subject. It is to be noted that the motor 72 is driven via the operation amplifier 48a and a shutter (not shown) is driven at the time of the exposure.

Next, a second embodiment of the control circuit according to the present invention will be described.

It is to be noted that the same components as those of the first embodiment are denoted with the same reference numerals in the following embodiment, and the description of the constitution and operation is omitted.

Figure 6A:
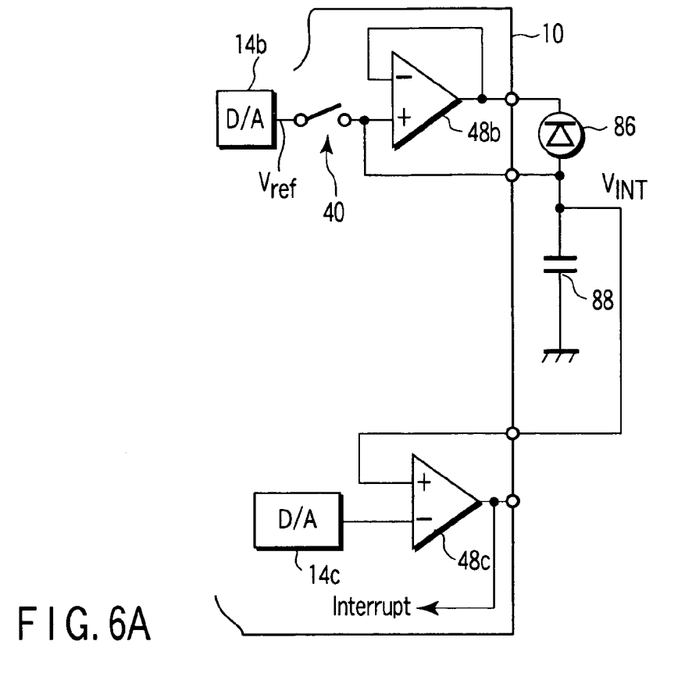
FIG. 6A is an electric circuit diagram showing the constitution of the control circuit according to a second embodiment of the present invention.

FIG. 6A is an electric circuit diagram showing the constitution of the second embodiment. The second embodiment relates to a modification of a circuit (hereinafter referred to as a photometry circuit) including the photodiode 86 to detect the brightness of the subject.

Figure 6B:
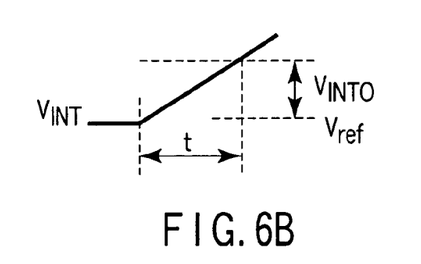
FIG. 6B is a diagram showing a change of an integral voltage of a capacitor 88 of FIG. 6A.

That is, in the present embodiment, the transistor 64 is excluded. Instead, the D/A converter 14b and switch 40 are used to perform the switching. Accordingly, there can be provided an integration circuit in which integration is carried out from a predetermined reference voltage $V_{ref}$. That is, when the D/A converter 14b is disconnected from the operation amplifier 48b (i.e., this corresponds to the turning-off of the transistor 64 in FIG. 5), integration is started. At this time, assuming that an integral voltage, that is, a charge voltage of the capacitor 88 is $V_{INT}$, as shown in FIG. 6B, $V_{INT}$ increases from $V_{ref}$ in proportion to an integral time after the start of the integration.

Figure 6C:
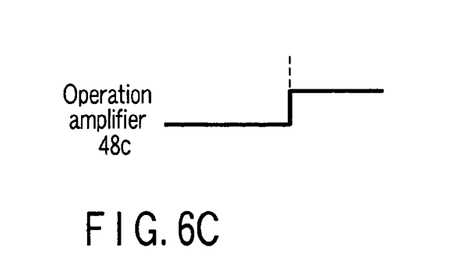
FIG. 6C is a diagram showing an output of an operation amplifier 48c of FIG. 6A.

This $V_{INT}$ is inputted into the plus side terminal of another operation amplifier 48c. The minus side terminal of the operation amplifier 48c is connected to another D/A converter 14c. In this D/A converter 14c, a predetermined voltage higher than $V_{ref}$ by $V_{INTO}$ is generated. Therefore, when the integral voltage $V_{INT}$ reaches $V_{INTO}$, as shown in FIG. 6C, the output of the operation amplifier 48c is reversed. An amount of light incident upon the LED 86, that is, the brightness of the subject can be detected from the time t and the set voltage $V_{INTO}$ of the D/A converter 14c.

The operation amplifier 48c is used as a comparator in the photometry circuit in the present embodiment, and a response having a rate higher than that of the photometry circuit in the first embodiment is possible. It is possible to detect the brightness of the light momentarily emitted like a flash light in this high-rate photometry circuit.

In the above-described first and second embodiments, the control circuit which is applicable to various circuits and which has versatility can be provided in a constitution in which only two terminals are taken out of the operation amplifier.

Next, the circuit constitution example of the whole camera system to which the control circuit is applied will be described as the third embodiment of the present invention.

It is to be noted that here an example of the constitution of the control circuit according to the present invention to a power supply circuit, not to the above-described motor control circuit or the photometry circuit, will be described.

Figure 7:
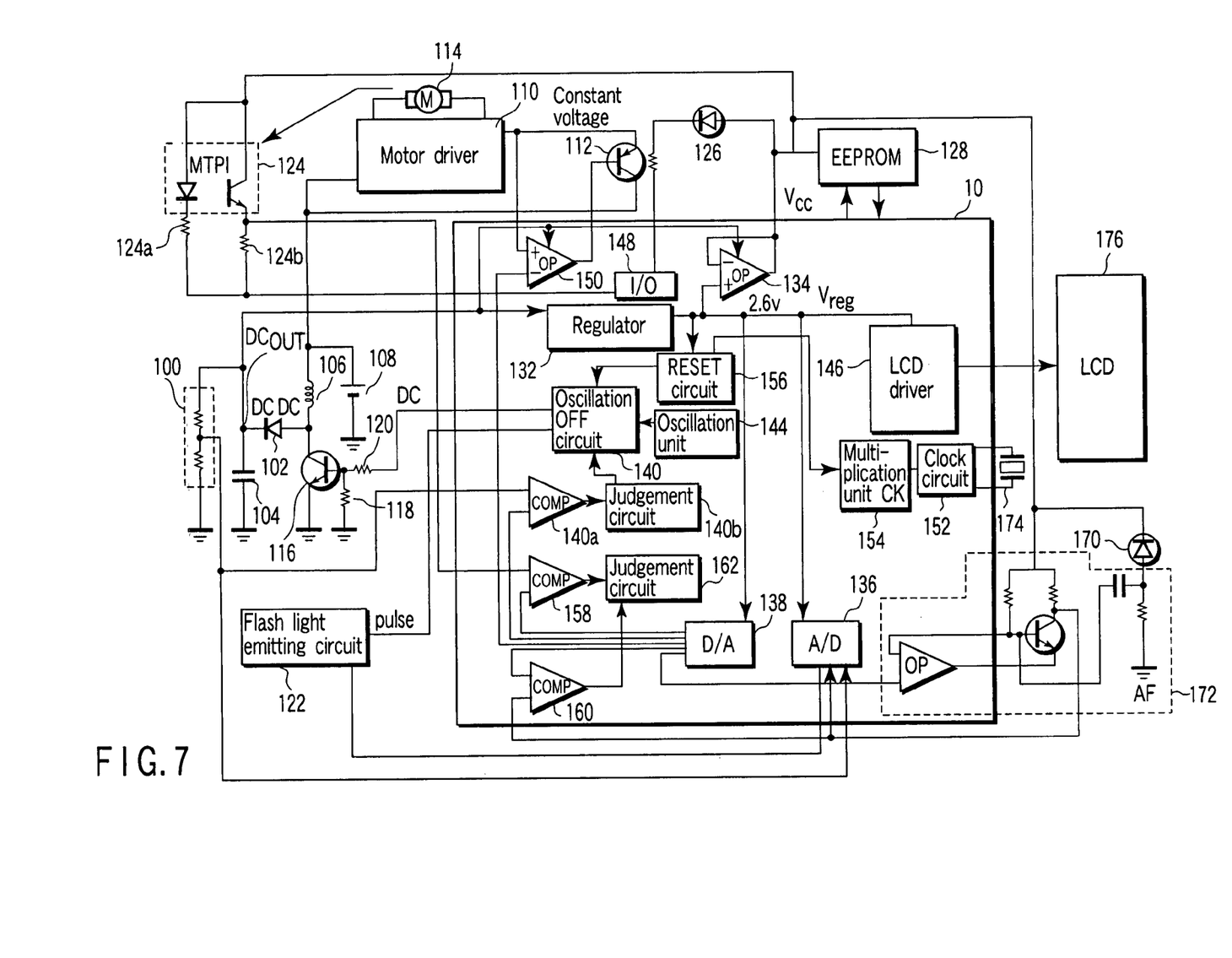
FIG. 7 is an electric circuit diagram showing an electric circuit constitution of a camera system to which the constitution of an AF circuit including the application of the control circuit and photodetection circuit according to a third embodiment of the present invention is applied.

That is, in the present embodiment, as shown in FIG. 7, a regulator 132 is built in the same chip as the IC constituting the control circuit 10. An output from the regulator 132 can be taken to an external circuit via a buffer 134 having a connection form shown in FIG. 3C. The divided voltage of a resistance array 100 depending on an output $DC_{OUT}$ of the DC/DC converter is inputted into an A/D converter 136, but is also inputted into an operation amplifier 140*a* disposed in the control circuit 10.

Here, a diode 102 and capacitor 104 of the DC/DC converter are connected to the regulator 132 in the control circuit 10. Furthermore, the diode 102 is connected to a motor driver 110 and transistor 112 via an inductor 106 and battery 108. The diode 102 is also connected to an oscillation off circuit 140 via a transistor 116 and resistances 118, 120. Furthermore, the oscillation off circuit 140 is connected to a flash light emitting circuit 122.

In the DC/DC converter, the transistor 116 is on-controlled by the signal outputted from an oscillation unit 144 built in the control circuit 10, and the current from the battery 108 flows into the inductor 106. At this time, the capacitor 104 is charged by the voltage generated in the inductor 106. The charge voltage of the capacitor 104 is $DC_{OUT}$ at this time. Moreover, after $DC_{OUT}$ is divided in the resistance array 100, the divided voltage is inputted into the A/D converter 136. The control circuit 10 monitors the divided voltage by the value detected by the A/D converter 136.

However, a program in which the result of the A/D converter 136 is only constantly monitored is not sufficient sometimes. That is, when a high-rate control has to be performed over a comparatively long time, a time required for taking in the result of the A/D converter 136 is a time lag, and precise control cannot be performed.

It is to be noted that as an example requiring the high-rate control, for example, when a dating timing is controlling in dating a film or a position of zoom lens id detected, a boost of the DC/DC converter has to be sometimes monitored.

Therefore, in the present embodiment, the operation amplifier 140*a* is used as a comparator (hereinafter referred to as the comparator 140*a*) for comparing predetermined voltages DA1, DA2. Moreover, when $DC_{OUT}$ is in a predetermined level, a judgment circuit 140*b* that has judged this turns off the oscillation off circuit 140, and a boosting operation of the boost DC/DC converter is stopped. It is to be noted that in this oscillation off circuit 140, oscillation into the DC/DC converter is stopped, and additionally an output voltage at the time of the oscillation stop is fixed at the L level so as to prevent the transistor 116 from remaining to be on, when the oscillation is stopped.

Figure 8:
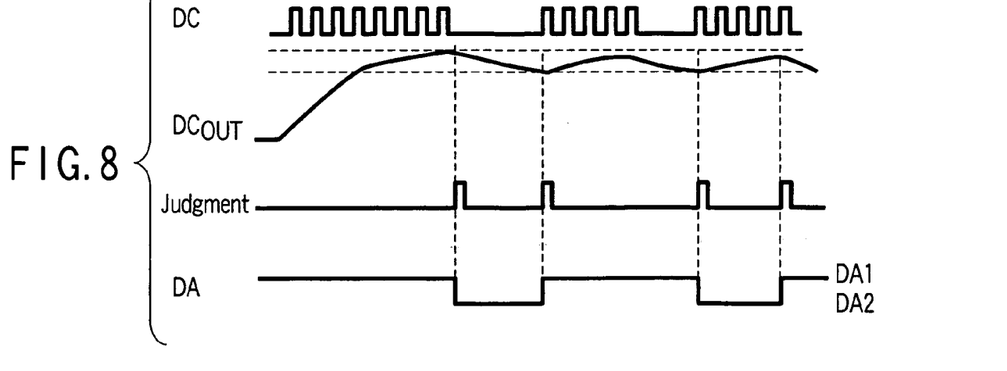
FIG. 8 is a timing chart at the time of a DC/DC converter control in the third embodiment of the present invention.

Next, the control of the DC/DC converter in the circuit constituted in this manner will be described with reference to a timing chart of FIG. 8.

In this control, $DC_{OUT}$ is controlled within the predetermined level. It is to be noted that a D/A converter 138 can switch a judgment voltage to be inputted into the comparator 140*a* in accordance with the program written in a ROM (not shown). Accordingly, for the judgment voltage of the comparator 140*a*, two types of voltages DA1, DA2 shown in FIG. 8 can be selected.

That is, the voltage DA1 on a high level side is used at the time of the boost. On the other hand, the voltage DA2 on the low level side is used at the time of the boost stop. In the judgment circuit 140*b*, it is judged by the output of the comparator 140*a* whether or not $DC_{OUT}$ exceeds the selected judgment voltage. Moreover, when it is judged that the judgment voltage exceeds $DC_{OUT}$, the judgment circuit 140*b* switches/controls the oscillation off circuit 140 or the operation program.

After boosting the battery voltage, the output from the regulator 132 is supplied as a reference voltage of the D/A converter 138, A/D converter 136, and LCD driver 146, and also functions as a constant voltage source of each circuit outside the control circuit 10 via the buffer 134. For example, the output from the regulator 132 functions as a power supply for a photo interrupter circuit (shown as MTPI) 124 for detecting rotation of a motor 114, an LED 126 for display, or an EEPROM 128 in which various data is recorded. Moreover, the output of the photo interrupter circuit 124 is supplied to an I/O section 148 via resistances 124*a*, 124*b*.

Furthermore, the output of the regulator 132 can also be applied as a power source for stabilizing an AF block 172 for detecting the size of a light signal incident upon a light receiving device 170 at the time of projection control of a light projection section (not shown).

It is to be noted that an output pulse of the oscillation unit 144 is also used as a pulse for charging the flash light emitting circuit 122 in the circuit of FIG. 7. The A/D converter 136 also monitors a charge state of flash in the flash light emitting circuit 122.

Moreover, the output of the D/A converter 138 is also inputted into an operation amplifier 150, and the motor driver 110 is constant-voltage driven together with the transistor 112. Furthermore, the motor driver 110 performs a rate control of the motor 114. This is similar to the constitution described with reference to FIG. 5.

It is to be noted that the operation amplifier 150 for the motor driver directly takes the power voltage from $DC_{OUT}$ without supplying power from the regulator 132, so that even the high voltage can be handled.

Furthermore, in the circuit of FIG. 7, the pulse outputted from an oscillation unit 174 is measured with a clock circuit 152 for the dating. The oscillation unit output is multiplied with a multiplication unit (multiplication CK) 154 to generate a main clock of the control circuit 10.

Moreover, a reset (RESET) circuit 156 resets the control circuit 10, when a remaining amount of the battery 108 is used up, and correctly restarts the control circuit 10, when a new battery is charged.

Furthermore, the outputs of the photo interrupter circuit 124 and AF block 172 inputted into comparators 158, 160 are judged in a judgment circuit 162.

Additionally, an LCD 176 is driven by the LCD driver 146 in the control circuit 10.

Figure 9A:
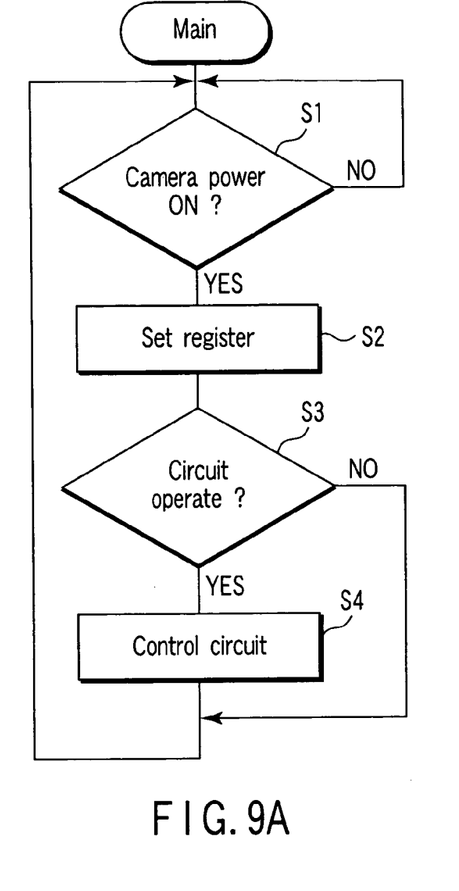
FIGS. 9A and 9B are flowcharts for operating/controlling the operation amplifier built in a CPU in the camera in accordance with setting of a register.
Figure 9B:
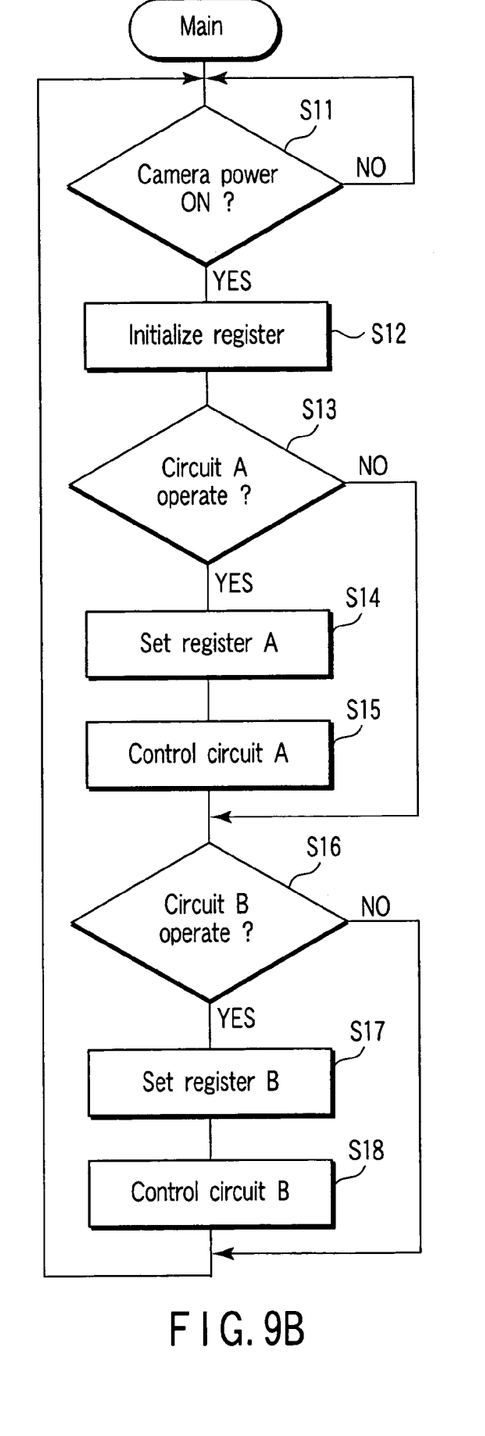

Next, the control of the operation amplifier circuit at the time of the operation of the camera will be described with reference to FIGS. 9A and 9B. It is to be noted that the detailed operation of each circuit in the camera system has been described above, and the description is therefore omitted here.

First, the control of the operation amplifier which handles the setting of the register (not shown) will be described with reference to FIG. 9A. It is to be noted that a case where the circuit constitution of the operation amplifier circuit does not have to be changed during the control of the operation amplifier circuit, for example, the photometry circuit of FIG. 5 will be described.

First, it is judged in step S1 whether or not a power switch (not shown) of the camera is turned on. When it is judged that the power switch is not turned on, the control circuit 10 is on standby until the power switch is turned on. On the other hand, when it is judged that the power switch is turned on, the step shifts to step S2. The operation of the camera is started, and the inner register (the first register 30 of FIG. 1) is set by the control circuit 10. The switches 40, 42, 44, 46 of FIG. 1 are switched based on the setting of the register to constitute a desired operation amplifier circuit.

It is to be noted that the setting of the circuit constitution of the operation amplifier circuit may be performed before operating the circuit that is an object, and may also be performed in a step other than the above-described step.

After ending the setting of the operation amplifier, it is judged in step S3 whether or not the set operation amplifier circuit is operated. Here, when it is judged that the set operation amplifier circuit is operated, the step shifts to step S4 to control the operation of the operation amplifier circuit. After ending the above-described operation, the step returns to the step S1.

On the other hand, when it is judged in the step S3 that the set operation amplifier circuit is not operated, the step returns to the step S1 as such.

It is to be noted that when the power switch (not shown) is turned off during the control of the flowchart, the control of the present flowchart is ended.

Next, the control in changing the setting of the register, for example, in switching the motor control circuit (hereinafter referred to as circuit A) and LED control circuit (hereinafter referred to as circuit B) will be described with reference to FIG. 9B.

First, it is judged in step S11 whether or not the power switch (not shown) of the camera is turned on. When it is judged that the power switch is not turned on, the control circuit 10 is on standby until the power switch is turned on. On the other hand, when it is judged that the power switch is turned on, the step shifts to step S12. The operation of the camera is started, and the inner register is initialized by the control circuit 10.

It is next judged in step S13 whether or not the inner operation amplifier circuit is operated as the circuit A by the control circuit 10. For example, in the example of FIG. 5, it is judged whether or not the circuit is used for controlling the motor. When it is judged that the operation amplifier circuit is operated as the circuit A (motor control circuit), the step shifts to step S14 to set the value of the register so that the operation amplifier circuit is brought in the form of the circuit A, that is, the form shown in FIG. 3A. Moreover, in the subsequent step S15, the operation amplifier circuit in the form of the circuit A is operated/controlled.

On the other hand, when it is judged in the step S13 that the operation amplifier circuit is not operated as the circuit A, the step shifts to step S16 to judge whether or not the operation amplifier circuit is operated as the circuit B (LED control circuit). For example, in the example of FIG. 5, it is judged whether or not the circuit is used for controlling the LED. Here, when it is judged that the operation amplifier circuit is operated as the circuit B (LED control circuit), the step shifts to step S17 to set the value of the register so that the operation amplifier circuit is brought in the form of the circuit B. Moreover, in the subsequent step S18, the operation amplifier circuit in the form of the circuit B is operated/controlled. After ending the above-described operation, the step returns to the step S11.

When it is judged in the step S16 that the operation amplifier circuit in the form of the circuit B is not operated, the step returns to the step S1 as such.

It is to be noted that when the power switch (not shown) is turned off during the control of the present flowchart, the control of the present flowchart is ended.

As described above, when the camera system is constituted as shown in FIG. 7, major components can be constituted in the same chip as that of IC constituting CPU, and it is possible to provide a product having a merit in cost and space. It is to be noted that when a timer (not shown) is operated after turning on the power switch, and there is not any input signal for a predetermined time in FIGS. 9A, 9B, the control of the flowchart may also be ended.

Next, a fourth embodiment of the present invention will be described.

Figure 10:
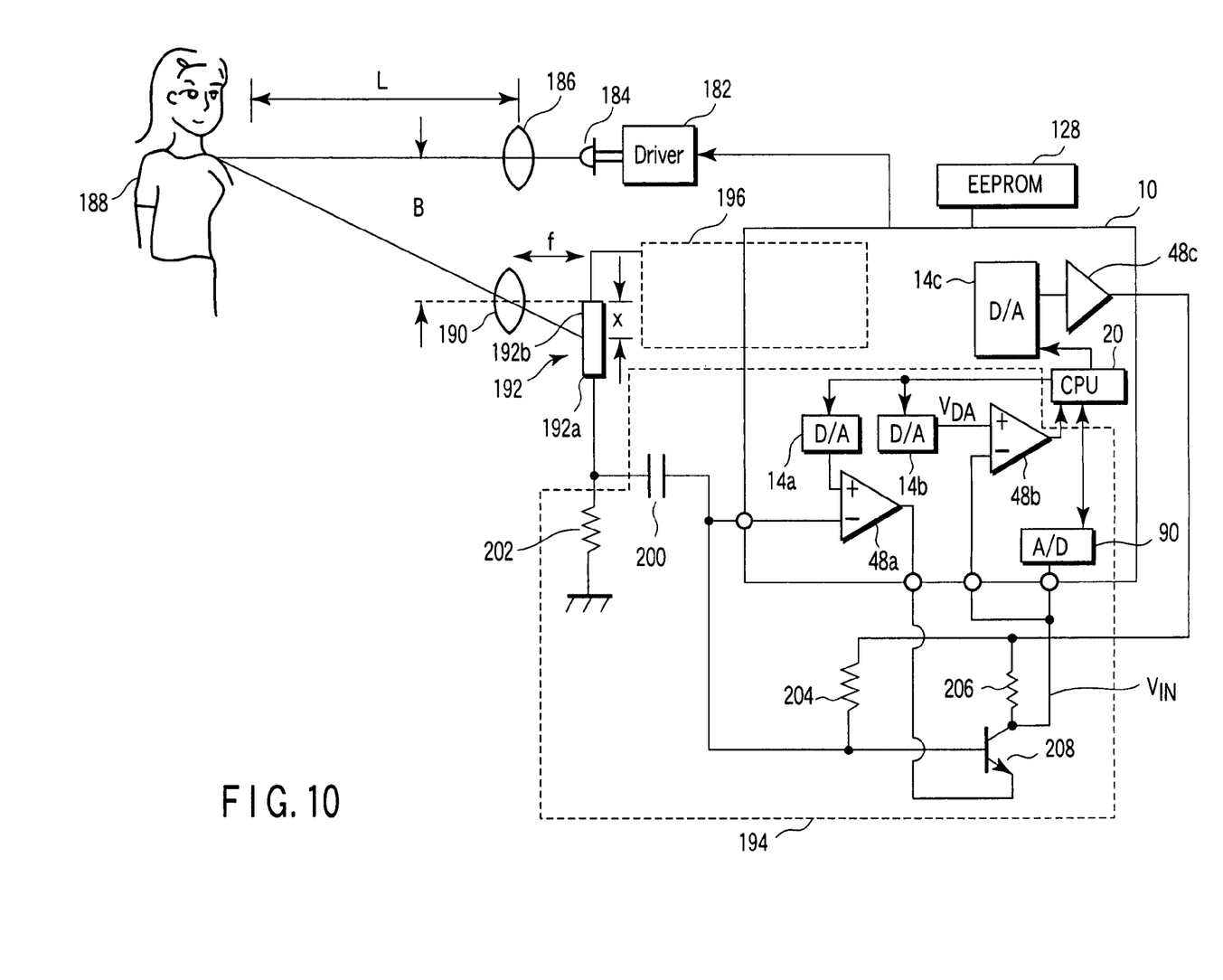
FIG. 10 is a block diagram showing a constitution example of the photodetection circuit using the operation amplifier in which a CPU chip is built according to a fourth embodiment of the present invention.

FIG. 10 is a block diagram showing a constitution example of the photodetection circuit using an operation amplifier 48 in which the CPU chip is built according to the fourth embodiment of the present invention.

In FIG. 10, in the control circuit 10, the core CPU 20 controls each register or peripheral circuit via an inner bus (not shown).

The operation amplifier 48a and D/A converter 14a are set in the form shown in FIG. 3A by the analog switch (not shown). Moreover, the operation amplifier 48b and D/A converter 14b are used as the comparators, and in the same manner as in FIG. 3A, the output of the D/A converter 14b is inputted into the plus side input. Furthermore, an A/D converter 90 is disposed in the control circuit 10, and the core CPU 20 can judge an analog voltage level via the A/D converter 90. Moreover, the operation amplifier 48c and D/A converter 14c are set in the form shown in FIG. 3D. The operation amplifier 48c performs a function of the buffer circuit to output the voltage with respect to the voltage outputted from the D/A converter 14c. This voltage is a power voltage of an AF circuit described later.

The control circuit 10 is connected to an infrared light emitting diode (IRED) 184 via a driver 182. A luminous flux emitted from this infrared light emitting diode 184 is reflected by a subject 188 via a projection lens 186, and received by a light receiving device 192 via a light receiving lens 190. The control circuit 10 is also connected to the EEPROM 128 in which, for example, the information of various components is stored.

The light receiving device 192 is divided into light receiving devices 192a, 192b in accordance with a light receiving position, and outputs are supplied to AF circuits 194, 196.

The AF circuit 194 is constituted of a capacitor 200, resistances 202, 204, 206, and a bipolar transistor 208 disposed outside the control circuit 10, and the operation amplifier 48a and comparator 48b in the control circuit 10. Among these, the capacitor 200 and resistance 202 constitute a bypass filter, and the bipolar transistor 208 constitutes a current amplifier. The resistance 204 is used for determining a bias point of the transistor 208, and the resistance 206 has a function of converting an amplification output current into the voltage.

The luminous flux incident upon the light receiving device 192a is converted to a current depending on a light current, and does not enter the base of the transistor 208 by the capacitor 200. However, when the IRED 184 emits a pulse light via the driver 182, an infrared light is projected onto the subject 188 via the projection lens 186, and the light reflected from the subject 188 is incident upon the light receiving devices 192a, 192b via the light receiving lens 190.

Since the signal light current generated at this time has a pulse state, a change (signal light current) passes through the capacitor 200 and flows into the base of the transistor 208 whose input impedance is lowered by the input amplifier (operation amplifier) 48a. Accordingly, the current multiplied by a current amplification factor ($\beta$) of the transistor is generated as the change in a collector of the transistor 208, and flows through the resistance 206, and therefore the level of $V_{IN}$ drops. This level drop of $V_{IN}$ depends on the size of the signal light, and indicates a large amount, when a subject distance is short.

It is to be noted that the AF circuit 196 includes a circuit constitution similar to that of the AF circuit 194. To avoid complicated drawing and duplicated description, the drawing and description are omitted with reference to the AF circuit 194.

Figure 11:
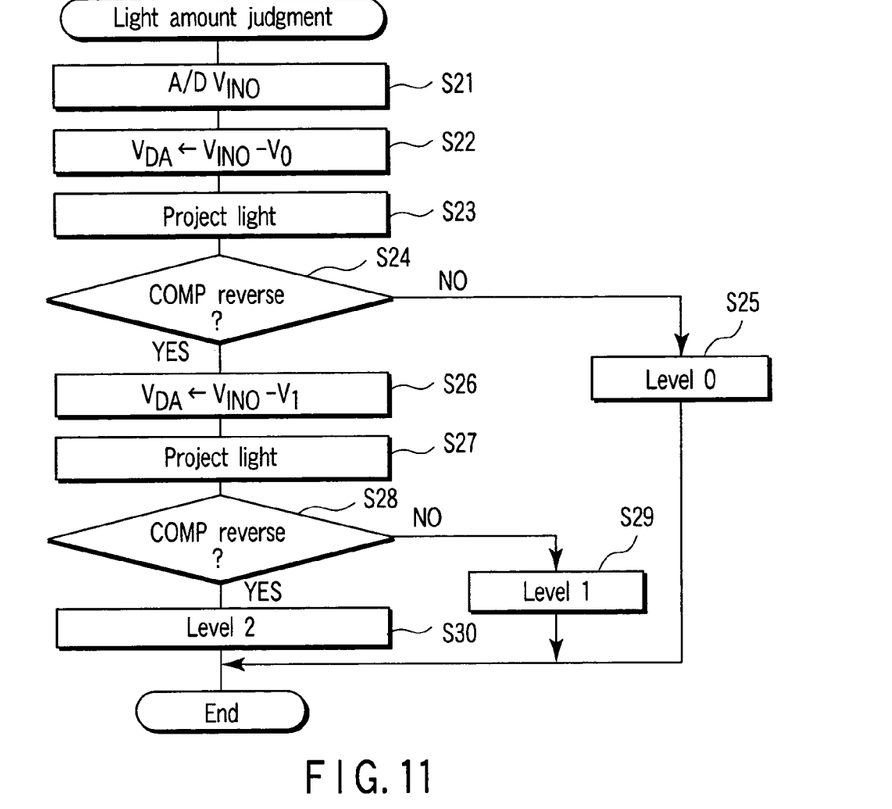
FIG. 11 is a flowchart showing a sequence of light amount judgment controlled by the CPU.

Next, a sequence of light amount judgment, controlled by the CPU, will be described with reference to a flowchart of FIG. 11.

First, in step S21, the level of $V_{IN}$ before IRED emission is detected by the A/D converter 90. This is because the output level at the time of non-signal is not necessarily constant because of performances of components or temperature changes, and this level is set to $V_{IN0}$. The CPU accordingly performs the judgment. In the subsequent step S22, a predetermined level $V_0$ is subtracted from $V_{IN0}$ to obtain a judgment voltage $V_{DA}$. This $V_0$ may be corrected by fluctuations of the components, and may therefore be calculated from the value inputted in the EEPROM 128 in which the performances of the components are stored. The fluctuation may be estimated and determined from $V_{IN0}$ obtained in the step S21.

When the level $V_{DA}$ to be outputted from the D/A converter 14b is determined, the IRED 184 emits the light in step S23. Then, $V_{IN}$ drops in accordance with the light amount returned from the subject 188. It is next judged in step S24 whether or not the comparator (COMP) 48b is reversed.

Here, when the light amount is large, the output of the comparator 48b is reversed. In this case, the step shifts to step S26. However, when the output of the comparator 48b is not reversed, the light amount is small, and it is judged that the subject is far. In this case, the step shifts to step S25 to set the light amount level to level 0.

When the reverse is detected in the step S24, a value obtained by subtracting $V_1$ much larger than $V_0$ is newly obtained as a judgment level $V_{DA}$ in step S26. Moreover, the light is projected in step S27, and the reverse of the comparator is detected again in the subsequent step S28.

Here, when the reverse of the comparator is not detected, the step shifts to step S29 to set the light amount level to level 1. On the other hand, when the reverse of the comparator is detected, the step shifts to step S30 to set the light amount level to level 2.

Figure 12:
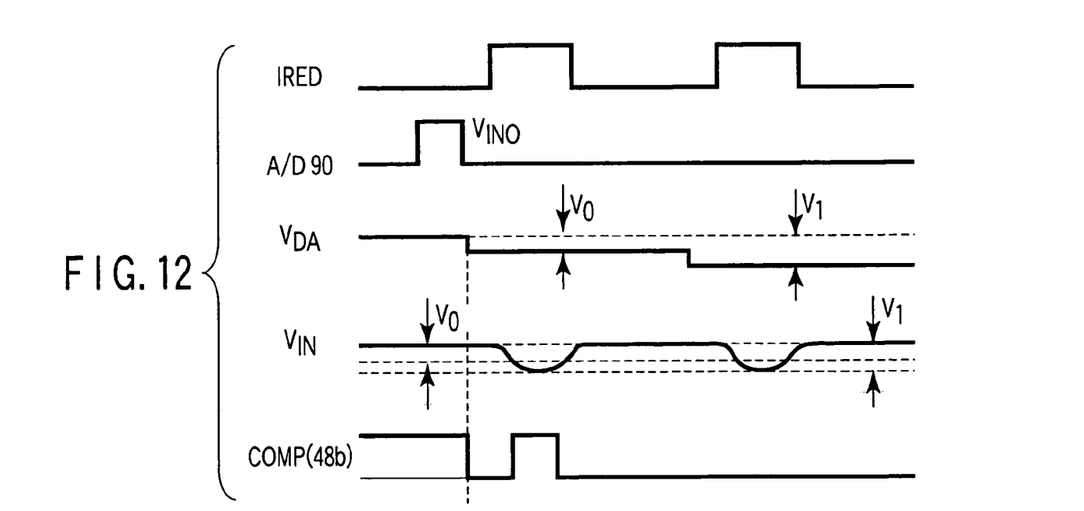
FIG. 12 is a timing chart showing the operation of the light amount judgment.

FIG. 12 is a timing chart showing the operation of the above-described light amount judgment.

First, an output $V_{IN0}$ of the resistance 206 is detected by the A/D converter 90, $V_0$, $V_1$ are subtracted as judgment levels from the level, and this state is shown as $V_{DA}$. When the IRED 184 emits the light in pulses in this state, $V_{IN}$ described above drops in accordance with the size of the signal light current as shown. In this example, the level is larger than $V_0$ and smaller than $V_1$. Therefore, the comparator 48b is reversed, only when $V_0$ is set, and is not reversed, when $V_1$ is set. That is, this is an example of the level 1 of the step S29 in the flowchart of FIG. 11. This change may also be detected by the high-rate A/D converter.

It is to be noted that the setting of $V_0$, $V_1$ is determined in consideration of the offset of the comparator 48b, and this offset voltage may be stored in the EEPROM 128. A short or long distance can be judged in accordance with the level obtained in this manner. That is, when the change of $V_{IN}$ is large, the short distance can be judged. When the change is small, the long distance can be judged.

Moreover, as shown in FIG. 10, the light receiving device 192 is divided into two devices 192a, 192b. The distance may also be determined by a triangular distance measuring principle by judging whether much reflected signal light is incident upon either device.

In this case, as described above, the AF circuit 194 is similar to the AF circuit 196. That is, assuming that a distance (base length) between light projecting/receiving lenses is B, and a focal distance of the light receiving lens is f, two divided light receiving devices are disposed in such a manner that the reflected signal light enters a position x between two sensors with a distance $L_0$. Moreover, when more light is incident upon the light receiving device 192b, the distance can be judged to be shorter than $L_0$. When more light enters the light receiving device 192a, the distance can be judged to be longer than $L_0$. Moreover, this position x can be determined as $B \cdot f / L_0$.

The general-purpose circuit in the CPU chip is thoroughly used in this manner, and it is possible to design a distance detection unit for focusing with a very simple constitution.

Figure 13:
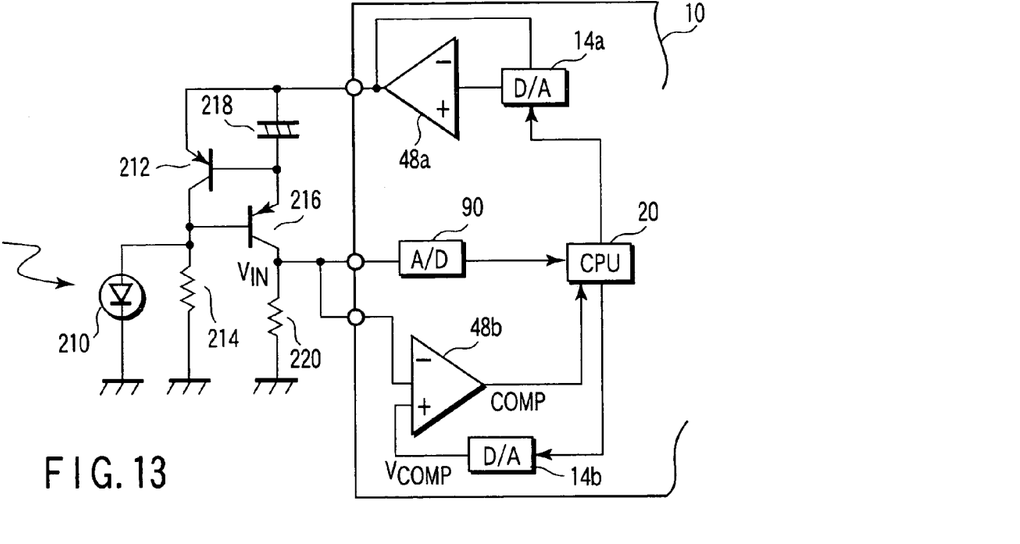
FIG. 13 is a diagram showing the constitution example of a circuit to detect a reflected signal light amount.

Moreover, the circuit for detecting the reflected signal light amount may simply include the circuit constitution shown in FIG. 13.

In FIG. 13, the voltage for the power supply outputted by the D/A converter 14a is outputted to the outside via the buffer 48a, and supplied to an analog circuit section disposed outside. The external analog section outside the control circuit 10 is constituted of a transistor 216 for amplification and a resistance 220 for voltage change, in which a collector current is stabilized by a resistance 214 and a transistor 212 for stabilizing the bias, a capacitor 218 for preventing oscillation by incoming noises, and the like.

Figure 14:
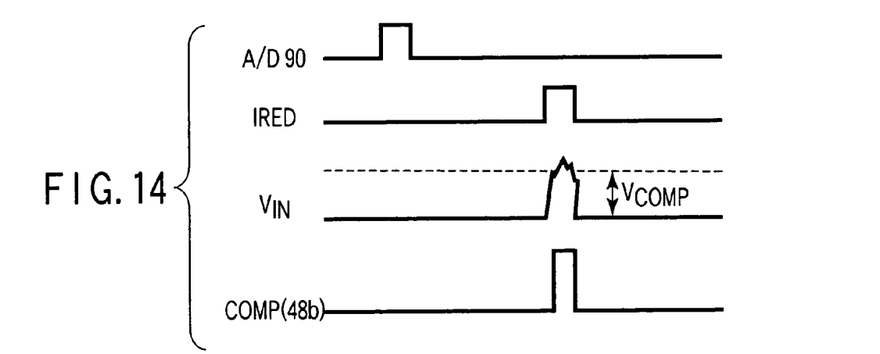
FIG. 14 is a timing chart showing a voltage change caused in a load resistance 220 of the circuit of FIG. 13.

Moreover, the voltage changes in the load resistance 220 in synchronization of the signal light reception of a photodiode (light projection system is not shown) 210 which receives the reflected signal light as shown in a timing chart of FIG. 14. That is, the voltage of the load resistance 220 is monitored by the A/D converter 90 before the light emission. Moreover, a voltage $V_{COMP}$ higher than the monitored voltage by a predetermined level is outputted to the D/A converter 14b, the IRED (not shown) is allowed to emit the light, and the reflected signal light amount can be detected by judging whether or not the comparator 48b is reversed.

Figure 15:
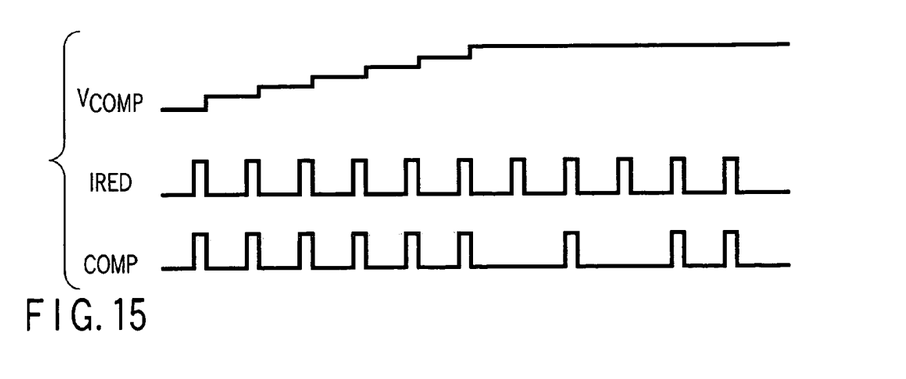
FIG. 15 is a timing chart showing an operation of each component of the circuit of FIG. 13.

Moreover, when this $V_{COMP}$ is successively changed and IRED emission is repeatedly performed as in a timing chart of FIG. 15, the incoming level of the signal light can be judged. Moreover, if a detection result is confusing depending on a noise level, the emission may also be performed many times as shown in the chart in order to enhance reliability.

Also in this circuit, the level of $V_{IN}$ fluctuates by the fluctuation of the resistance value of the resistance or the fluctuation of the current amplifier of the transistor. However, this is checked beforehand by the A/D converter 90, and reflected in the judgment voltage of the comparator 48b that monitors the change at the time of the projection, and therefore a correct reflected light amount can be detected.

As described above, according to the present embodiment, there can be provided a high-precision AF circuit in which the peripheral circuit built in the control circuit 10 is effectively used, and the external circuits are reduced as much as possible.

Next, a fifth embodiment of the present invention will be described.

Figure 16:
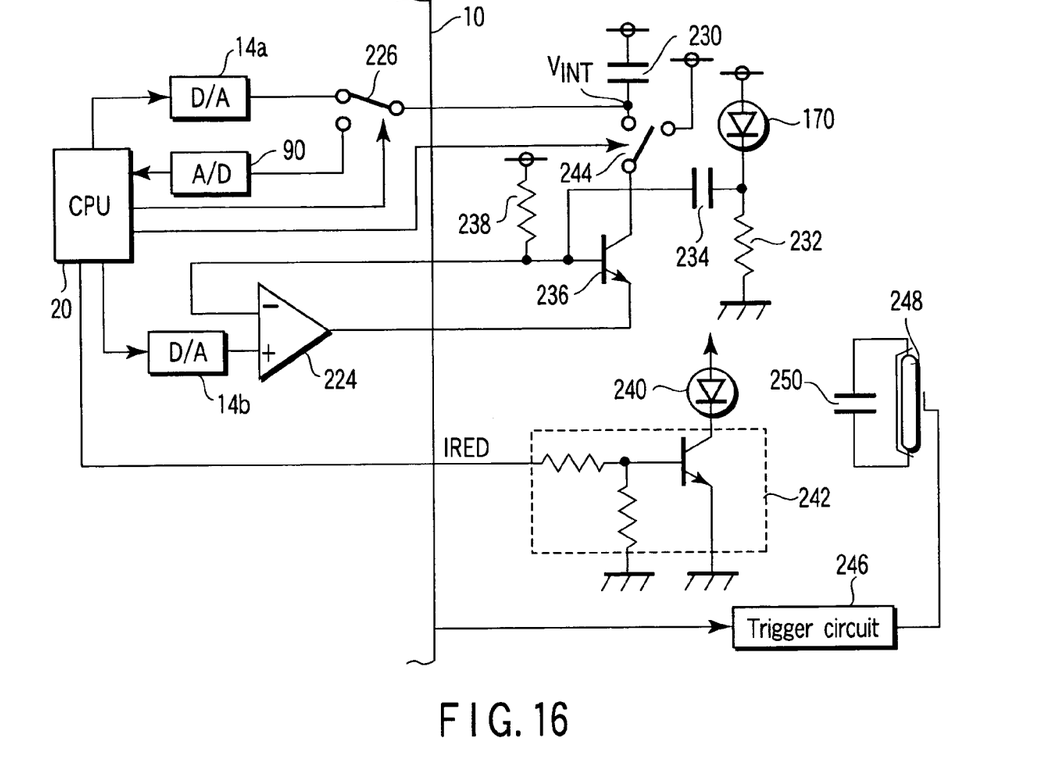
FIG. 16 is a block diagram showing a constitution example of the whole system of the camera using an AF circuit to which the photodetection circuit is applied according to a fifth embodiment of the present invention.

FIG. 16 is a block diagram showing a constitution example of the whole system of the camera using the AF circuit to which the photodetection circuit is applied according to the fifth embodiment of the present invention.

In the fifth embodiment, the circuit constitution is similar to that of FIG. 10 described above. However, in the circuit, instead of the resistance, an integral capacitor 230 and D/A converter 14a are used, the level of the integral capacitor 230 is initialized, and the A/D converter 90 for reading light current components integrated in the integral capacitor 230 by a function switch 226 of the same port is used.

For the integral capacitor 230, the connection between the D/A converter 14a and the A/D converter 90 is switched by the switch 226 in the control circuit 10. A switch 244 switched by the control of the core CPU 20 is connected between the integral capacitor 230 and a transistor 236 of the AF circuit in the same manner as the switch 226. It is to be noted that the AF circuit is constituted of resistances 232, 238, a capacitor 234, and the like in addition to the transistor 236.

Moreover, an infrared light emitting diode (IRED) 240 is controlled by the core CPU 20 in the control circuit 10 via a projection circuit 242.

Figure 17:
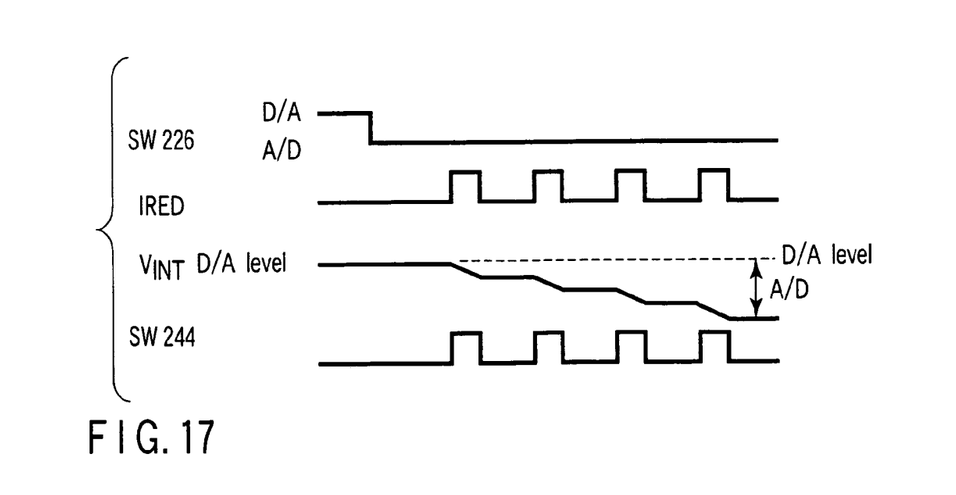
FIG. 17 is a timing chart showing the operation of each component by the system including the constitution of FIG. 16.

In this constitution, for the integration on the integral capacitor 230, the switch 244 is switched on an integral capacitor side in synchronization with the emission of the IRED 240 to obtain an integral waveform ($V_{INT}$) as shown in FIG. 17.

When a plurality of emission/reflection results are accumulated in an analog manner in an integration system, random noise components are offset, and the light amount can be judged with a higher precision by A/D. In this system, the analog switch to be switched in two directions is used, but a general-purpose component may also be constituted, and the switch may also be built in the control circuit 10, for example, as shown in FIGS. 2A, 2B.

The integral capacitor has heretofore been initialized using the analog switch, but the D/A converter is used instead in the present embodiment.

Moreover, when the flash emission is used instead of IRED, the circuit can effectively be used not only as the distance-measuring circuit but also a light-adjusting circuit for controlling a flash irradiation effect. It has heretofore been difficult to detect the flash emission effect in a bright scene, but a simple constitution can be obtained by the present circuit.

In this case, a xenon (Xe) tube 248 for emitting a flash light is lit/controlled by the control circuit 10 via a trigger circuit 246. It is to be noted that a capacitor 250 is a main capacitor for charging energies of the flash emission. A sensor for visible light is used to realize the light-adjusting circuit in which intensity of the flash light is adjusted in the similar circuit constitution.

The present invention has been described above based on the embodiments, but the present invention is not limited to the above-described embodiments, and needless to say, various modifications and applications are possible in the scope of the present invention.

For example, two input/output terminals of the comparator constituted of the operation amplifier constituted on the same chip as the CPU may also be switched to a CMOS input terminal or an interrupt terminal of the CPU.

According to the fourth to sixth embodiments, an inexpensive photodetection circuit can be provided with the effective use of the microcomputer high in versatility even in the inexpensive constitution.

According to the embodiments described above in detail, when a large number of operation amplifiers high in versatility are arranged on the same chip as the IC constituting the one chip microcomputer, there can be provided a control circuit that is small in size, low in cost, and high in versatility.

Moreover, when the number of terminals from the operation amplifier is reduced to reduce the number of terminals of the whole IC, the IC is miniaturized, and an IC main body can be reduced in space and cost.

Furthermore, since a remarkably simple analog circuit is effectively built in, the versatility is superior, and the mass production effect can be anticipated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A photodetection circuit comprising:
    a light receiving device which receives a reflected light flux from an objective;
    a conversion circuit which amplifies an output of the light receiving device to convert the output to a voltage signal;
    a comparator which compares the voltage signal with a predetermined level for comparison;
    an A/D converter which detects a level of the voltage signal;
    a voltage control circuit which switches the level for comparison in accordance with the output of the A/D converter; and
    a projection circuit including a light projecting device to project a light flux for measurement on the objective,
    wherein the voltage control circuit determines the level for comparison at a time of operation of the projection circuit in accordance with an output result of the A/D converter before driving the projection circuit.

2. The photodetection circuit according to claim 1, wherein the A/D converter and the comparator are provided on a same chip as the voltage control circuit.

3. The photodetection circuit according to claim 1, wherein the light flux projection of the projection circuit is performed a plurality of times, and the voltage control circuit switches the voltage level for comparison in accordance with a plurality of projections a plurality of times.

4. A photodetection circuit comprising:
    a light receiving member which receives and photoelectrically converts a light that passes through an optical member;
    a detection circuit which detects the photo-electrically converted light;
    an integrated circuit that is on a single chip, on which a microcomputer is mounted, and includes an A/D converter, a D/A converter and an operation amplifier; and
    an external connection terminal which connects an input terminal and an output terminal of the detection circuit to any of the A/D converter, the D/A converter, and the operation amplifier.

5. The photodetection circuit according to claim 4, further comprising:
    a switch section which allows selectively connecting an input terminal of the operation amplifier to at least one of the detection circuit, the A/D converter and the D/A converter and which allows selectively connecting an output terminal of the operation amplifier to one of the detection circuit and the microcomputer.

6. The photodetection circuit according to claim 4, wherein the operation amplifier has three terminals, two of which are input terminals and one of which is an output terminal, and wherein the photodetection circuit further comprises a switch section which switches two of the three terminals of the operation amplifier so that the two terminals are connectable to an external circuit of the integrated circuit.

7. The photodetection circuit according to claim 5, wherein the operation amplifier comprises one of a constant voltage source and a comparator by the switch section.

8. The photodetection circuit according to claim 5, wherein the light receiving member is provided such that one of a signal relating to distance measurement and a signal relating to photometry is detected by the detection circuit.

9. A photodetection apparatus comprising:

means for receiving and photoelectrically converting a light that passes through an optical member;

means for detecting the photoelectrically converted light;

an integrated circuit which is formed on a single chip, on which as a microcomputer is mounted, and which includes an A/D converter, a D/A converter, and an operation amplifier; and external connection means for connecting an input and an output of the detection means to any of the A/D converter, the D/A converter, and the operation amplifier.

* * * * *